(12) United States Patent
Greenwood et al.

(10) Patent No.: US 10,843,570 B2
(45) Date of Patent: Nov. 24, 2020

(54) CONTROL SYSTEM FOR A MOTOR VEHICLE AND METHOD

(71) Applicant: Jaguar Land Rover Limited, Coventry (GB)

(72) Inventors: Jeremy Greenwood, Coventry (GB); Phil Barber, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 118 days.

(21) Appl. No.: 15/770,599

(22) PCT Filed: Dec. 9, 2016

(86) PCT No.: PCT/EP2016/080441
§ 371 (c)(1),
(2) Date: Apr. 24, 2018

(87) PCT Pub. No.: WO2017/097980
PCT Pub. Date: Jun. 15, 2017

(65) Prior Publication Data
US 2019/0054826 A1    Feb. 21, 2019

(30) Foreign Application Priority Data

Dec. 9, 2015 (GB) .................................. 1521667.4

(51) Int. Cl.
*B60L 3/10* (2006.01)
*B60L 15/20* (2006.01)

(52) U.S. Cl.
CPC .............. *B60L 3/102* (2013.01); *B60L 3/108* (2013.01); *B60L 15/20* (2013.01);
(Continued)

(58) Field of Classification Search
CPC .......... B60L 3/102; B60L 15/20; B60L 3/108; B60L 2240/461; B60L 2260/26;
(Continued)

(56) References Cited

U.S. PATENT DOCUMENTS 3,840,790 A * 10/1974 Stich ........................ H02P 6/08
                                                                318/400.41
4,223,255 A * 9/1980 Goldman ................ B60L 50/52
                                                                318/400.41
(Continued)

FOREIGN PATENT DOCUMENTS

CN        1608888 A      4/2005
CN      103650327 A      3/2014
(Continued)

OTHER PUBLICATIONS

Patents Act 1977: Combined Search and Examination Report under Sections 17 and 18(3), UKIPO Application No. GB1521667.4 dated Apr. 19, 2016, 5 pp.
(Continued)

*Primary Examiner* — Ruth Ilan
*Assistant Examiner* — Felicia L. Brittman
(74) *Attorney, Agent, or Firm* — Reising Ethington P.C.

(57) ABSTRACT

A motor vehicle control system (210C, 220) for controlling an electric propulsion motor (230) to drive a wheel (290) of the vehicle (200), the control system (210C, 220) being configured to operate in one of a first mode and a second mode in dependence at least in part on an amount of slip experienced by at least one driven wheel (290), in the first mode the control system (210C, 220) being configured to cause the at least one electric propulsion motor (230) to generate a predetermined amount of drive torque, in the second mode the control system (210C, 220) being configured to cause the at least one electric propulsion motor (230)

(Continued)

to rotate at a predetermined speed, wherein the control system (210C, 220) is configured to operate in the first mode if the amount of slip experienced by the at least one driven wheel (290) is below a predetermined slip amount and to operate in the second mode if the amount of slip experienced by the at least one driven wheel (290) exceeds the predetermined slip amount.

17 Claims, 5 Drawing Sheets

(52) U.S. Cl.
CPC ..... *B60L 2220/46* (2013.01); *B60L 2240/423* (2013.01); *B60L 2240/461* (2013.01); *B60L 2240/465* (2013.01); *B60L 2260/26* (2013.01); *Y02T 10/64* (2013.01); *Y02T 10/72* (2013.01)

(58) Field of Classification Search
CPC ......... B60L 2240/465; B60L 2240/423; B60L 2220/46; B60L 3/10; Y02T 10/7275; Y02T 10/645; H02P 6/14
USPC ..... 180/197; 318/254.1, 400.01, 400.15, 700
See application file for complete search history.

(56) References Cited

U.S. PATENT DOCUMENTS

| | | | | |
|---|---|---|---|---|
| 5,476,310 | A * | 12/1995 | Ohtsu | ..................... B60L 3/108 180/165 |
| 5,511,866 | A | 4/1996 | Terada et al. | |
| 8,554,441 | B1 | 10/2013 | Johansson et al. | |
| 8,638,052 | B2 * | 1/2014 | Hohn | ..................... B60L 15/025 318/400.09 |
| 2005/0090965 | A1 | 4/2005 | Kamata et al. | |
| 2014/0111130 | A1 | 4/2014 | Yamada | |
| 2014/0329639 | A1 * | 11/2014 | Matoba | ..................... B60K 6/48 477/5 |
| 2015/0149010 | A1 * | 5/2015 | Matsui | ..................... B60K 6/48 701/22 |
| 2015/0175009 | A1 | 6/2015 | Beever et al. | |
| 2016/0214486 | A1 | 7/2016 | Suzuki | |
| 2016/0250929 | A1 | 9/2016 | Nakano et al. | |

FOREIGN PATENT DOCUMENTS

| | | |
|---|---|---|
| CN | 103998270 A | 8/2014 |
| CN | 104044588 A | 9/2014 |
| CN | 104364135 A | 2/2015 |
| DE | 19540067 A1 | 4/1997 |
| GB | 2486072 A | 6/2012 |
| GB | 2504834 A | 2/2014 |
| GB | 2523647 A | 9/2015 |
| JP | 2015066996 A | 4/2015 |
| WO | WO2013137439 A1 | 8/2015 |
| WO | WO 2015/151193 A1 | 10/2015 |

OTHER PUBLICATIONS

Patents Act 1977: Combined Search and Examination Report under Sections 17 and 18(3), UKIPO Application No. GB1620958.7, dated May 25, 2017, 7 pp.
Patents Act 1977: Examination Report under Section 18(3), UKIPO Application No. GB1620958.7, dated Mar. 5, 2018, 3 pp.
International Search Report and Written Opinion of the International Searching Authority, International Application No. PCT/EP2016/080441, dated Feb. 22, 2017, 11 pp.
Chinese Office Action corresponding to Chinese Application No. Cn 201680071068.6, dated Sep. 30, 2020, 10 pages.

\* cited by examiner

CONTROL SYSTEM FOR A MOTOR VEHICLE AND METHOD

RELATED APPLICATIONS

This application is a 35 U.S.C. § 371 national stage application of PCT Application No. PCT/EP2016/080441, filed on Dec. 9, 2016, which claims priority from Great Britain Patent Application No. 1521667.4, filed on Dec. 9, 2015, the contents of which are incorporated herein by reference in their entireties. The above-referenced PCT International Application was published in the English language as International Publication No. WO 2017/097980 A1 on Jun. 15, 2017.

TECHNICAL FIELD

The present disclosure relates to a motor vehicle control system and a method of controlling an electric propulsion motor. Aspects of the invention relate to a vehicle, a method, carrier medium, computer program product, non-transitory computer readable carrier medium and a processor.

BACKGROUND

It is known to provide a controller for controlling a propulsion motor of a motor vehicle. Modern (brushless) motors, and in particular synchronous motors such as switched reluctance motors and permanent magnet DC motors, are controlled by power electronics with commutation controlled in response to an estimate of the angular position of the motor. Within the controller, local speed control algorithms may be implemented using motor position information to estimate motor speed. In essence the commutation controller aligns the stator (or rotor—some machines are organised with the fixed field in the stator, others have the constant field (or permanent magnet) in the rotor) magnetic field in relation to the magnetic field on the rotor (stator). The magnitude and (mis)alignment of the fields generates torque in the motor. In a normal commutation approach, the misalignment is maintained at a fixed angle, as the motor turns. Two further approaches can be established:
1) a local speed controller can be implemented using a closed loop speed control algorithm such as a proportional-integral-differential (PID) algorithm to control the motor torque; or
2) a position demand can be established to fix the absolute position of the stator (rotor) magnetic field, towards and from which deviations in position will produce a torque, for example a position controlled stepper motor.

Electric machines may be employed to provide drive torque as well as brake torque, thus implementing regenerative braking functionality. Known controllers for motor vehicle electric motors utilise a similar control structure to conventional anti-lock braking system (ABS) controllers. In these the brake torque is modulated (released and reapplied) in reaction to sudden drops in wheel speed, indicating a slipping of the wheel on the road.

FIG. 1 illustrates a known arrangement for controlling a wheel 190 of a vehicle. A controller 110C receives a signal 155 indicative of the amount of travel of an accelerator pedal of the vehicle and a signal 156 indicative of the speed of the wheel 190. The controller 110C calculates an amount of torque that should be developed by an electric machine 130 in order to drive the wheel, in the illustrated example via a gearbox 140. The controller 110C transmits a signal 151 to an inverter 120 that delivers power to the electric machine 130 to develop the required torque. The inverter 120 comprises a controller for controlling the power delivered to the electric machine 130.

The controller 110C monitors the wheel speed signal 156 and compares the signal 156 to a vehicle reference speed value calculated by the controller 110C. The reference speed value is an estimate of vehicle speed. Methods of calculating a value of vehicle reference speed are known, and include calculating an average value of the vehicle's wheel speeds, taking the speed of the fastest turning wheel, or the speed of the second fastest turning wheel. A change in wheel torque value is then calculated taking into account the amount of slip of the wheel 190 in order to control the amount of slip and prevent excessive slip, and a wheel torque signal 151 generated in order to enable the inverter to cause the motor 130 to develop the required amount of slip. The actual torque required to control the wheel 190 to avoid excessive slip is not directly known, depending as it does on the variable nature of the surface, and therefore a feedback loop attempts to control the wheel speed by varying the torque until the desired speed (slip) is achieved. Thus, the controller 110C implements a torque control functionality in attempting to prevent excessive wheel slip.

FIG. 2 is an example of a plot of wheel speed as a function of time (upper trace) and corresponding brake torque as a function of time (lower trace) during braking in a vehicle having the wheel control arrangement of FIG. 1. In order to effect regenerative braking the electric machine 130 is operated as a generator in order to develop negative (braking) torque. At time t1 the wheel speed is shown to fall dramatically and a reduction in brake torque occurs due to passage of the wheel over a surface of relatively low surface coefficient of friction. The controller 110C responds to this change in wheel speed by reducing the amount of negative torque commanded by the torque signal 151, resulting in the wheel speed slowly increasing back to a speed closer to the ground speed of the vehicle 1 due to the (limited) adhesion to the road. When the wheel speed is restored to one similar to the vehicle speed, that is the wheel stops slipping, the regenerative brake torque can then be reapplied. It can be seen that oscillations in wheel speed occur as the controller 110C continually attempts to maintain control of the wheel speed during braking. This can result in increased noise, vibration and harshness (NVH) associated with the driving experience of a user as well as a poor deceleration of the vehicle.

It is an aim of the present invention to address disadvantages associated with the prior art.

SUMMARY OF THE INVENTION

Aspects and embodiments of the present invention provide a control system, vehicle, method, carrier medium, computer program product, non-transitory computer readable carrier medium and a processor. Embodiments of the invention may be understood with reference to the appended claims.

In one aspect of the invention for which protection is sought there is provided a motor vehicle control system for controlling an electric propulsion motor to drive a wheel of the vehicle, the control system being configured to operate in one of a first mode and a second mode in dependence at least in part on an amount of slip experienced by at least one driven wheel, in the first mode the control system being configured to cause the at least one electric propulsion motor to generate a predetermined amount of drive torque, in the second mode the control system being configured to cause the at least one electric propulsion motor to rotate at a predetermined speed, wherein the control system is configured to operate in the first mode if the amount of slip experienced by the at least one driven wheel is below a predetermined slip amount and to operate in the second mode if the amount of slip experienced by the at least one driven wheel exceeds the predetermined slip amount.

Optionally, in the second mode the control system may be configured to cause the at least one electric propulsion motor to rotate at a predetermined speed by controlling the commutation of the motor so as to enforce a desired speed on the rotation of the magnetic field of the motor. For example, the commutation speed may be set to be equal to a speed corresponding to a rotation speed of the magnetic field that is equal to the predetermined speed, thereby causing the rotor of the electric propulsion motor to rotate at the predetermined speed.

Optionally, the electric propulsion motor is a synchronous motor, for example a switched reluctance motor or a permanent magnet DC electric motor. Advantageously, the rotation speed of the rotor of such motors is typically equal to the rotation speed of the magnetic field.

In an embodiment control of the motor in the first mode is performed in dependence on an estimate of an angular position of a rotor of the electric propulsion motor. In contrast to this the commutation is preferably independent of the rotor position when the control system is operating in the second mode.

Embodiments of the present invention have the advantage that unwanted oscillations in wheel speed, which may occur if a control system is operated solely in the first mode, which may be referred to as a torque control mode, may be prevented or substantially reduced. It is to be understood that switching between the first mode, which may be referred to as a torque control mode, and the second mode, which may be referred to as a speed control mode, may be made rapidly, enabling highly effective traction control to be implemented. The control system may be include a powertrain controller in some embodiments. In some embodiments the control system may include a traction control system controller.

The control system may be configured to calculate the amount of slip of at least one driven wheel in dependence on a reference speed signal indicative of a speed of travel of the vehicle over ground and at least one wheel speed signal, the system being configured to operate in the first or second modes in dependence on the amount of slip.

The control system may be configured to receive information indicative of a surface coefficient of friction between the wheel and a driving surface, the control system being configured to set the predetermined slip amount in dependence on the information indicative of a surface coefficient of friction.

The control system may be configured wherein the predetermined slip amount is calculated in dependence on whether the control system is causing a positive torque to be applied to the wheel or a negative torque to be applied to the wheel.

Optionally, the predetermined slip amount is set to a first value if the control system is causing a positive torque to be applied to the wheel and a second value if the control system is causing a negative torque to be applied to the wheel.

Thus, in some embodiments, in the event the control system is causing the vehicle to accelerate the predetermined slip amount is set to the first value. Conversely, in the event the control system is causing the vehicle to decelerate the predetermined slip amount is set to the second value.

The control system may be configured to receive the information indicative of a surface coefficient of friction between the wheel and a driving surface comprises the control system being configured to receive information indicative of a driving mode in which the vehicle is being operated.

Optionally, the control system being configured to receive information indicative of a driving mode comprises the control system being configured to receive information indicative of a state of a user-operable driving mode control input for selecting a driving mode of the vehicle.

Alternatively, the control system may be configured to receive information indicative of a driving mode that has been selected automatically by automatic driving mode selection means, optionally the control system or one or more other vehicle controllers or control systems.

Optionally, the driving modes are control modes of at least one subsystem of the vehicle.

Optionally, the driving modes are control modes of at least one subsystem selected from amongst an engine management system, a transmission system, a steering system, a brakes system and a suspension system.

Optionally, the control system may be further configured to initiate control of the or each of the vehicle subsystems in the selected one of the plurality of subsystem control modes, each of the subsystem control modes corresponding to one or more different driving surfaces.

The control system may be configured to control a plurality of electric propulsion motors each configured to drive a respective wheel of the vehicle.

The control system may be configured to receive a commutation feedback signal from the electric propulsion motor, wherein when operating in the second mode the control system is configured to control the motor to rotate at the predetermined speed in dependence at least in part on the commutation feedback signal.

In a further aspect of the invention for which protection is sought there is provided a vehicle comprising a body, a plurality of wheels, a powertrain to drive said wheels, a braking system to brake said wheels, and a control system according to a preceding aspect.

In an aspect of the invention for which protection is sought there is provided a method of controlling, by means of a control system, an electric propulsion motor to drive at least one wheel of a vehicle, the method comprising causing the control system to operate in one of a first mode and a second mode in dependence at least in part on an amount of slip experienced by the at least one wheel, whereby in the first mode the method comprises causing the at least one electric propulsion motor to generate a predetermined amount of drive torque, and in the second mode the method comprises causing the at least one electric propulsion motor to rotate at a predetermined speed, whereby the control system is configured to operate in the first mode if an amount of wheel slip is below a predetermined slip amount and to operate in the second mode if an amount of wheel slip exceeds the predetermined slip amount.

In a further aspect of the invention for which protection is sought there is provided a non-transitory computer readable carrier medium carrying computer readable code for controlling a vehicle to carry out the method of a preceding aspect.

In one aspect of the invention for which protection is sought there is provided a computer program product executable on a processor so as to implement the method of a preceding aspect.

In an aspect of the invention for which protection is sought there is provided a non-transitory computer readable medium loaded with the computer program product of a preceding aspect.

In a further aspect of the invention for which protection is sought there is provided a processor arranged to implement the method or the computer program product of a preceding aspect.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements are also useful.

In an aspect of the invention for which protection is sought there is provided a motor vehicle control system for controlling an electric propulsion motor to drive a wheel of the vehicle, the control system being configured to operate in one of a first mode and a second mode in dependence at least in part on an amount of slip experienced by at least one driven wheel,
  in the first mode the control system being configured to cause the at least one electric propulsion motor to generate a predetermined amount of drive torque,
  in the second mode the control system being configured to cause the at least one electric propulsion motor to rotate at a predetermined speed,
wherein the control system is configured to operate in the first mode if the amount of slip experienced by the at least one driven wheel is below a predetermined slip amount and to operate in the second mode if the amount of slip experienced by the at least one driven wheel exceeds the predetermined slip amount, and wherein the control system is configured to determine that the amount of slip experienced by the wheel exceeds the predetermined amount if a speed of the wheel exceeds a speed indicated by a speed control signal.

Advantageously, such a system may provide traction control that is able to correct a loss of traction during acceleration more quickly than prior art traction control systems.

Some embodiments of the present invention provide a motor vehicle control system for controlling an electric propulsion motor to drive a wheel of the vehicle, the control system being configured to operate in either a first (torque-control) mode or a second (speed-control) mode in dependence at least in part on an amount of slip experienced by at least one driven wheel. If the amount of slip experienced by the at least one driven wheel is below a predetermined slip amount the system causes the at least one electric propulsion motor to generate a predetermined amount of drive torque. That is, the control system operates in the torque-control mode (the first mode). In contrast, if the amount of slip experienced by the at least one driven wheel exceeds the predetermined slip amount, the control system is configured to operate in the second mode. In the second mode the control system causes the at least one electric propulsion motor to rotate at a predetermined speed. That is, the control system operates in a 'speed-control mode'. Some embodiments of the present invention have the advantage that the amount of slip experienced by a wheel may be limited, and not become excessive, because the control system switches to the speed control mode in the event that the amount of slip exceeds the predetermined slip amount. In some embodiments, the amount of slip experienced by the wheel may be limited to a predetermined upper limit value by setting the speed of rotation of the wheel, in the speed control mode of operation, to a value that is determined in dependence at least in part on the speed of the vehicle over ground.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying drawings, in which.

DETAILED DESCRIPTION

Figure 1:
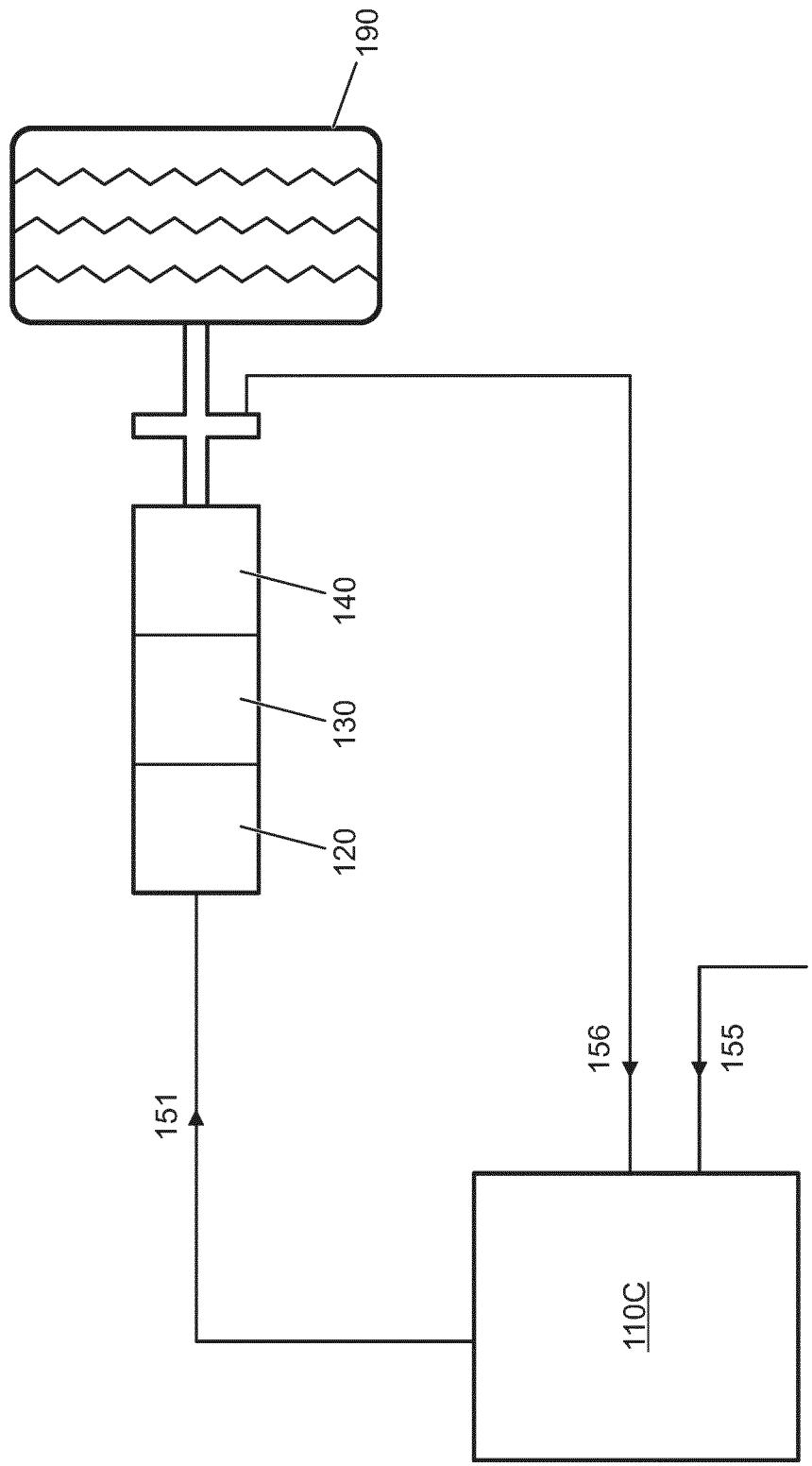
FIG. 1 is a schematic illustration of a known vehicle propulsion motor control arrangement.
Figure 3A:
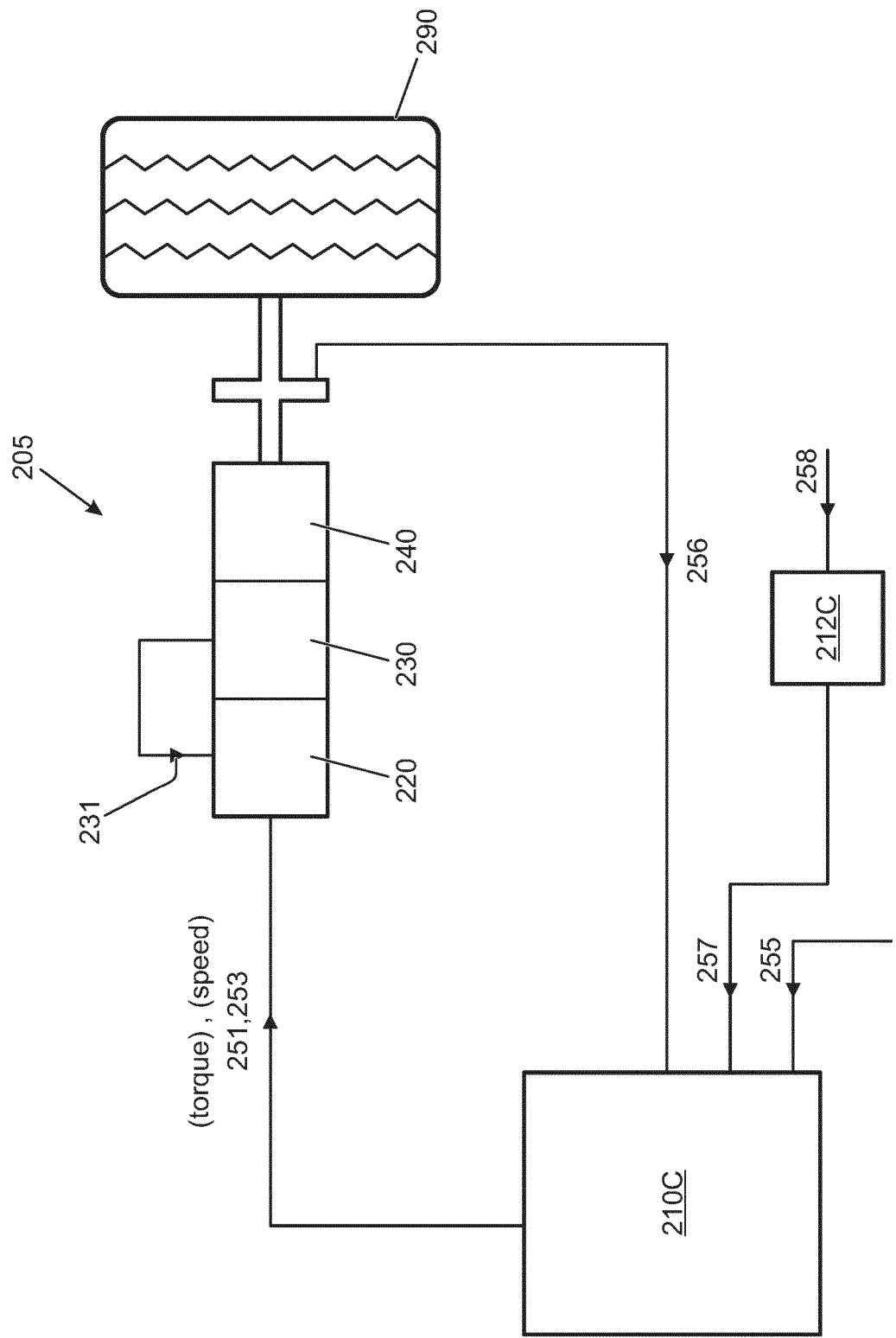
FIG. 3 shows a schematic illustration of (a) a vehicle propulsion motor control arrangement 205 according to an embodiment of the present invention and (b) a vehicle in which the arrangement shown in (a) is installed.
Figure 3B:
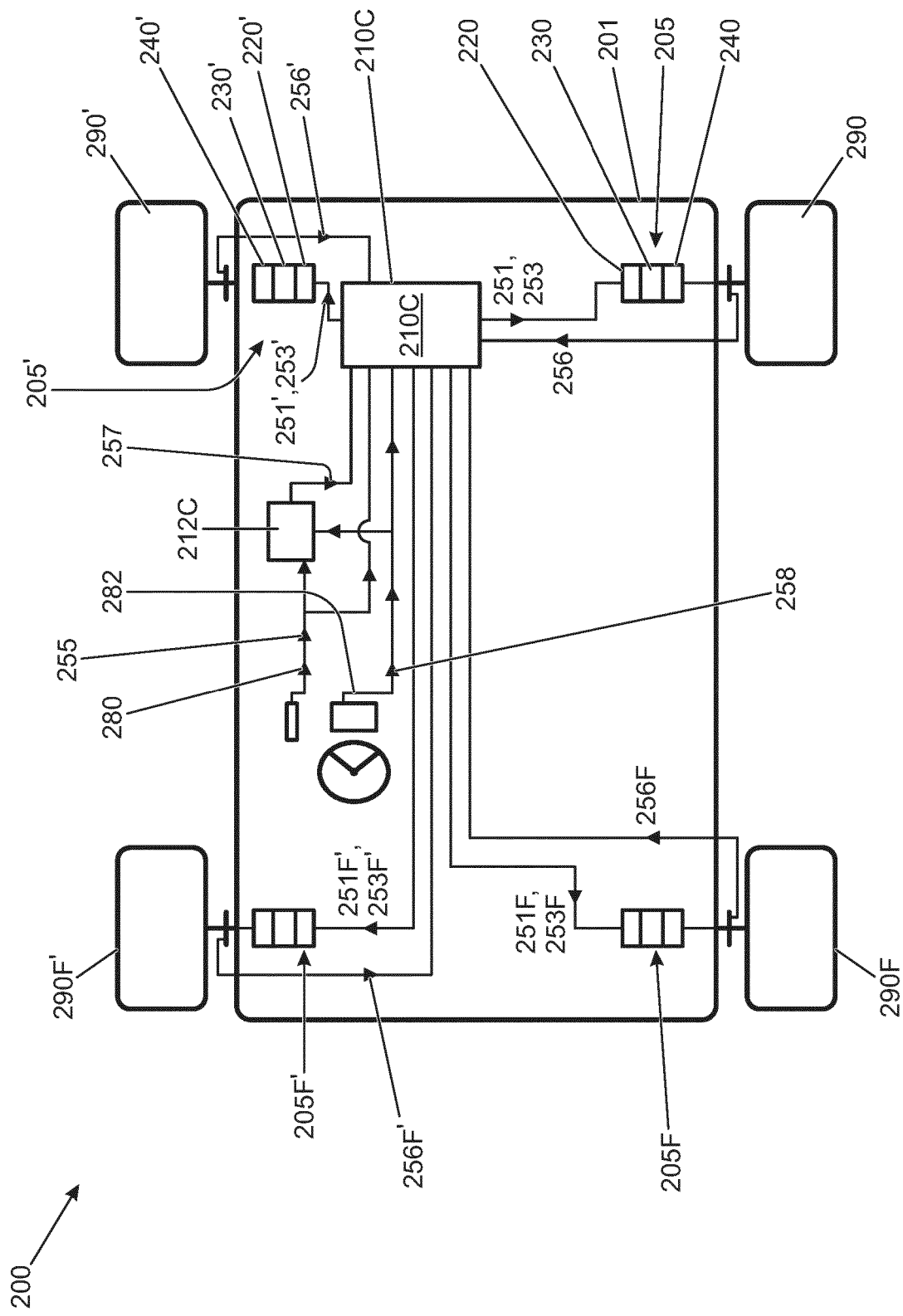

FIG. 3(*a*) is a schematic illustration of a vehicle propulsion motor control arrangement 205 according to an embodiment of the present invention. Like features of the embodiment of FIG. 3(a) to the arrangement 190 of FIG. 1 are shown with like reference signs incremented by 100. FIG. 3(b) is a schematic illustration of a vehicle 200 in which the arrangement 205 is installed. It is to be understood that the arrangement 205 illustrated in FIG. 3(a) is replicated at each front left and front right wheel 290F, 290F', and each rear left and rear right wheel 290, 290', of the vehicle 200, the respective arrangements 205F, 205F', 205, 205' sharing a common controller 210C. In the illustrated embodiment the electric machine 230 is a permanent magnet DC electric machine having stator windings that are configured to produce a rotating magnetic field, although it will be understood that the present invention could be implemented using other types of electric machine, especially, but not exclusively, other types of synchronous electric machine.

The controller 210C may be referred to as a powertrain controller 210C in some embodiments. In some embodiments the controller 210C may be referred to as a motor controller.

The controller 210C is configured to receive a signal 255 indicative of the amount of travel of an accelerator pedal 280 of the vehicle 200 and signals 256, 256', 256F, 256F' indicative of the speed of each wheel 290F, 290F', 290, 290' of the vehicle 200. The controller 210C also receives a signal 257 from a brake controller 212C indicative of the amount of brake torque that is required to be provided by the motor control arrangements 205, 205', 205F, 205F' in order to meet driver brake force demand. Brake force demand is determined by the brake controller 212C at least in part according to a signal 258 received by the brake controller 212C indicative of the amount of travel of a brake pedal 282 of the vehicle 200.

Operation of the controller 210C with respect to the control of a single motor control arrangement 205 will now be described. Control of the remaining arrangements 205', 205F, 205F' may be understood by extension.

The motor control arrangement 205 has an inverter 220 to control the individual stator windings of the machine, a permanent magnet DC electric machine 230 and gearbox 240 arranged to drive rear left-hand vehicle wheel 290. It will be understood that the invention may be implemented with other types of electric machine, and that for other types of electric machine the inverter may instead control the rotor windings, and possibly also the field (stator or rotor) windings in the case of a separately excited motor.

The electric machine 230 is configured to provide a commutation feedback signal 231 to the inverter 220 indicative of the position (and hence also the speed of rotation) of the electric machine 230.

The controller 210C monitors wheel speed signal 256 and compares the signal 256 to a vehicle reference speed value calculated by the brake controller 212C. The reference speed value is an estimate of vehicle speed and is set by the brake controller 212C to be, for example, the speed of the fastest turning wheel 290F, 290F', 290, 290' of the vehicle 200. It is to be understood that, in the case of the vehicle decelerating, the fastest turning wheel is typically indicative of the true speed of the vehicle, whilst in the case of the vehicle accelerating, the slowest wheel is typically indicative of the true speed of the vehicle. Other methods, for example using accelerometers, radars, vision systems or GPS may be used to provide estimates of true vehicle speed in some embodiments.

The controller 210C calculates two parameters that are transmitted to the inverter 220. The first parameter is a respective torque command in the form of a torque command signal 251 indicative of the amount of torque to be developed by the respective electric machine 230.

This is determined by the controller 210C in respect of each wheel individually in order to meet driver torque demand. The second is a speed command in the form of a speed command signal 253 indicative of the maximum or minimum allowable respective wheel speed, depending on whether the vehicle 200 is accelerating (in which case the speed command signal is indicative of the maximum allowable wheel speed) or decelerating (in which case the speed command signal is indicative of the minimum allowable wheel speed).

In the case that the vehicle is accelerating, the speed command signal 253 is calculated to indicate a wheel speed that exceeds the ground speed of the respective wheel (taking into account cornering) by a predetermined acceleration slip value S1. In the case that the vehicle is decelerating, the speed command signal 253 is calculated to indicate a wheel speed that is less than the ground speed of the wheel (taking into account cornering) by a predetermined deceleration slip value S2. In the present embodiment the values S1 and S2 are set to the same value of slip. The ground speed of a given wheel is determined by the controller in dependence on the vehicle reference speed, being an indication of vehicle speed over ground.

In the present embodiment, the values of slip S1, S2 are set in dependence on an estimated value of surface coefficient of friction, 'mu', between a given wheel and the driving surface at a given moment in time. It is to be understood that the estimated value of mu is maintained by the brake controller 212C and communicated to the controller 210C. Methods of estimating surface mu are well known. In the present embodiment the brake controller 212C calculates the value of mu in dependence on the values of vehicle reference speed, individual wheel speed and the amount of torque applied to a wheel at a given moment in time.

The inverter 220 is arranged to monitor the speed of the electric machine 230 by reference to the commutation signal 231 and to compare this speed with the value of speed indicated by the speed command signal 253. If the inverter 220 determines that the vehicle 200 is accelerating, and the commutation signal 231 indicates that the motor speed corresponds to a wheel speed that is less than or equal to the speed indicated by the speed command signal 253, the inverter 220 controls the electric machine 230 to develop an amount of torque corresponding to that indicated by the torque demand signal. However, if at any time the wheel speed exceeds that indicated by the speed command signal 253, the inverter 220 switches control of the electric machine 230 from a torque control mode to a speed control mode. In the speed control mode, the inverter 220 controls the electric machine 230 to maintain a substantially constant speed, substantially equal to that indicated by the speed command signal, unless the amount of torque developed by the electric machine 230 in order to do so would be required to exceed that indicated by the torque demand signal.

When operating in the speed control mode the controller 210C controls the inverter 220 to set the commutation speed (or the commutation frequency) to match a desired speed, without reference to the actual position of the motor. This may be referred to as "stepping" the commutation. It will be understood that, for a synchronous electric machine such as the permanent magnet DC electric machine 230, control of the commutation speed of the motor to match a desired speed will enforce a desired rotation speed on the magnetic field produced by the motor (in the illustrated embodiment the rotating magnetic field is produced by energising the windings on the stator, although it will be understood that for other types of electric machine the rotating magnetic field may be produced by energising windings on the rotor).

The rotor of permanent magnet DC electric machine 230, and hence wheel, aligns to the rotation speed of the magnetic field, because a difference between the rotation speed of the rotor and the magnetic field causes increasing misalignment between the rotor and the magnetic field. This misalignment causes a torque to act on the rotor in a direction that decreases the misalignment between the rotor and the magnetic field. The torque acting on the rotor increases with increasing misalignment between the rotating magnetic field and the rotor, so if the rotor rotates more slowly than the magnetic field produced by the stator the torque applied to the rotor will increase until it is sufficient to cause the rotor to rotate at the same speed as the magnetic field.

It will be understood that in a conventional control methodology for a propulsion motor the commutation is controlled to produce a target torque as indicated by a torque control signal. This is typically achieved by substantially continuously estimating the position of the rotor, and controlling to commutation to maintain a target misalignment between the position of the magnetic field and the position of the rotor. The target misalignment will typically correspond to the misalignment required to produce the target torque. Direct control of the commutation to enforce a desired speed on the rotation of the magnetic field is not used, because enforcing a speed on the commutation could result in excessive loads being applied to the rotor if more torque than the motor is rated to produce is required to cause the rotor to rotate at the rotation speed enforced by control of the commutation. Enforcing a speed on the commutation may also cause very significant slip to occur if it results in a high torque requirement that causes the wheels to lose traction.

The present inventors have recognised that when excessive wheel slip is already occurring the commutation speed can be directly controlled without causing excessive load to be applied to the electric machine or causing excessive slip, as the initial occurrence of excessive wheel slip is associated with a drop in the torque applied at the slipping wheel, and the drop in torque is maintained until the excessive slip ceases to occur. Accordingly, directly controlling the commutation speed of an electric machine associated with an already-slipping wheel to return the wheel to a speed that is closer to the speed that the wheel would turn at for the instantaneous vehicle speed if the wheel were not slipping does not cause excessive torque to be required of the electric machine. Furthermore, this approach and can quickly reduce the slip of the wheel back to an acceptable amount, thereby improving vehicle stability.

It is to be understood that, in normal driving on a surface where the value of mu is substantially unity, the speed of each wheel will be close to the vehicle reference speed and the speed of each wheel will not reach the speed indicated by the speed command signal (whether above or below the reference speed).

Taking the example of a braking scenario, the electric machine 230 may be controlled by the inverter 220 to operate as a generator in order to develop the required (negative) brake torque. The inverter 220 will attempt to cause the electric machine 230 to develop the required amount of brake torque according to the torque command signal 251. However, if the speed of the wheel 290 as determined by reference to the commutation signal 231 falls below that indicated by the speed command signal 253, the inverter 220 switches to control the speed of the electric machine by setting the commutation speed to a value that causes the magnetic field to rotate at a speed substantially equal to that indicated by the speed command signal 253. This initially causes the electric machine to apply a positive torque to the slipping wheel to increase its speed back to the speed indicated by the speed command signal 253. At this point the wheel is able to grip the driving surface and produce a braking effect at the optimum slip value, S2. As the vehicle slows, the vehicle reference speed falls and the speed indicated by the speed command signal 253 also falls.

It should also be noted that, unlike conventional friction brakes, additional torque can be automatically (inherently) applied by the motor, so as to accelerate the wheel back to the desired slip level, without relying on the adhesion with the road. This can be important, for example where lateral stability is required and a large excursion in slip levels would be detrimental to the safety of the vehicle.

If the wheel 290 encounters a surface of higher surface mu value whilst the controller 210C is operating in the speed control mode, the braking torque (measured by the inverter 220) will naturally increase. If the braking torque reaches a value corresponding to the torque command signal 251, the inverter 220 returns to the torque control mode and controls the electric machine 230 to develop an amount of torque corresponding to the torque command signal 251. Similarly, if a user reduces the pressure on the brake pedal when operating in the speed control mode then the torque command signal 251 may reduce to a value below that provided in the speed control mode (as measured by the inverter 220), whereupon the inverter will return to the torque control mode.

Figure 2:
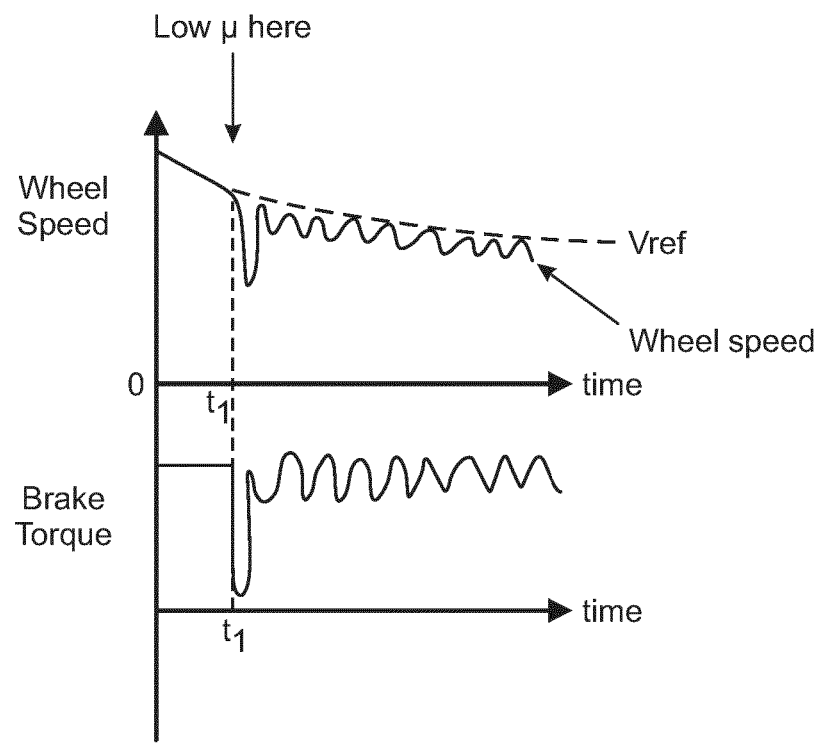
FIG. 2 is a plot of wheel speed as a function of time (upper trace) and corresponding brake torque as a function of time (lower trace) during regenerative braking in a vehicle having the wheel control arrangement of FIG. 1.
Figure 4:
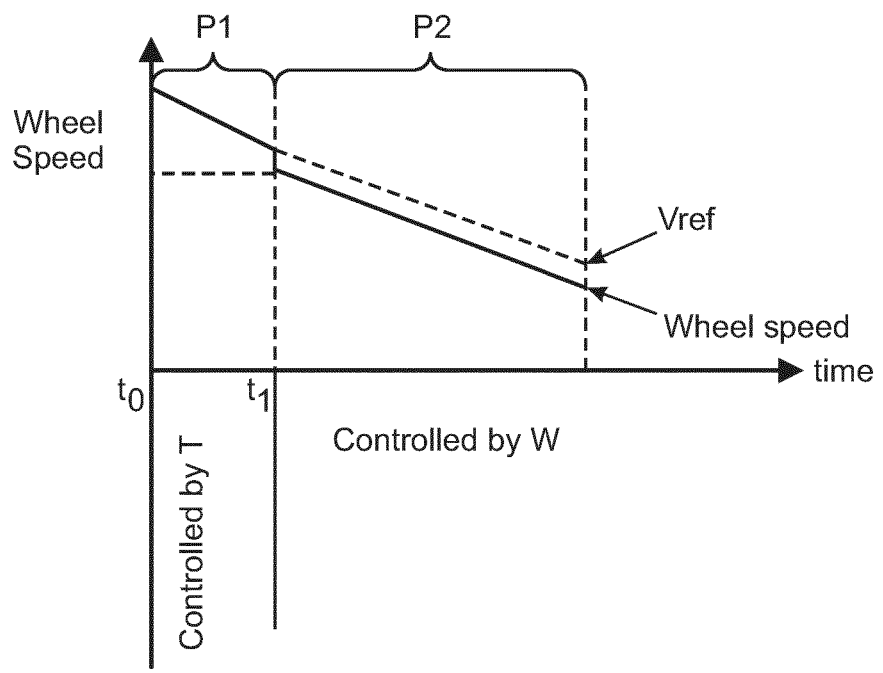
FIG. 4 is a plot of wheel speed as a function of time during regenerative braking in a vehicle having the wheel control arrangement of FIG. 3.

FIG. 4 is a plot of wheel speed as a function of time in a braking scenario similar to that illustrated in FIG. 2 for the known motor control arrangement. During a braking operation starting at time t0, the inverter 220 initially operates in a torque control mode, causing the electric machine 230 to develop an amount of brake torque corresponding to that indicated by the torque command signal 251. At time t1, after period P1 has expired, the speed of wheel 290 falls below that indicated by the speed command signal 253. The inverter detects the drop in wheel speed and switches to a speed control mode of operation in which the inverter is controlled to maintain the wheel 290 at a speed corresponding to that indicated by the speed command signal 253 by controlling the commutation so that the magnetic field generated by the stator rotates at a speed corresponding to that indicated by the speed command signal 253. Accordingly, the inverter 220 causes the electric machine 230 to maintain a speed that is lower than the vehicle reference speed by the predetermined slip value S2, which is the same as the value S1 as noted above.

Importantly, in some embodiments the electric machine speed control implemented by controlling the inverter 220 to set the commutation speed so that the magnetic field rotates at a desired speed allows excessive slip to be corrected very much faster than a conventional ABS (torque based) control architecture. Accordingly, performance of the motor control arrangement 205 shows a not insubstantial improvement over that of known vehicle control systems.

Figure 5:
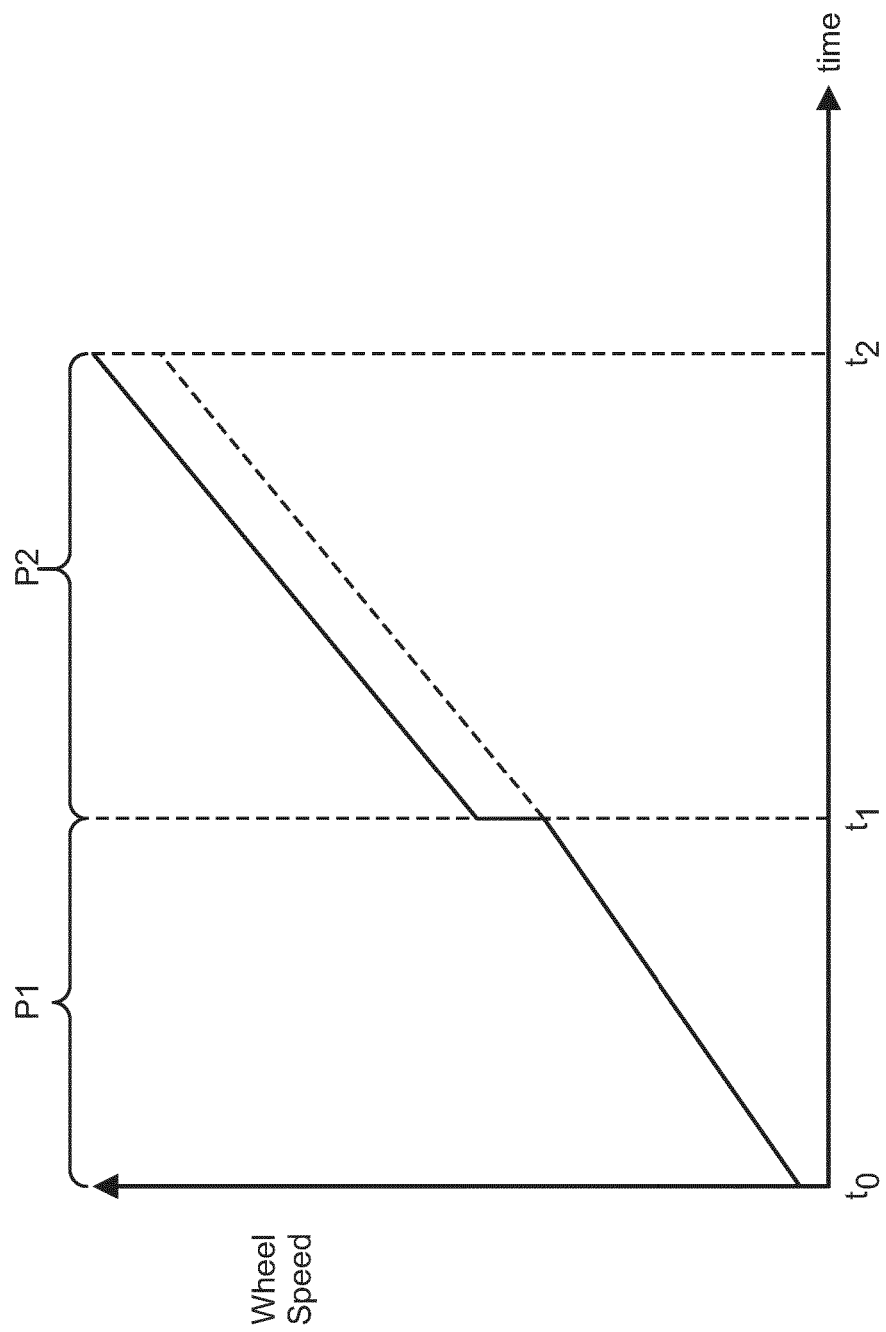
FIG. 5 is a plot of wheel speed as a function of time during a period of acceleration in a vehicle having the wheel control arrangement of FIG. 3.

FIG. 5 is an example plot of wheel speed as a function of time in a scenario in which the vehicle 200 is accelerating rather than braking. During a period of acceleration starting at time t0, the driver increases the amount of demanded torque by depressing the accelerator pedal 280. In response, the inverter 220 initially operates in a torque control mode, causing the electric machine 230 to develop an amount of drive torque corresponding to that indicated by the torque command signal 251. At time t1, after period P1 has expired, the vehicle traverses an area of relatively low surface mu during period P2. The speed of wheel 290 rises above that indicated by the speed command signal 253. The inverter 220 detects the increase in wheel speed and switches to a speed control mode of operation in which the inverter maintains the wheel 290 at a speed corresponding to that indicated by the speed command signal 253 by controlling the commutation so that the magnetic field generated by the stator rotates at a speed corresponding to that indicated by the speed command signal 253. Accordingly, the inverter 220 causes the electric machine 230 to maintain a speed that is higher than the vehicle reference speed by the predetermined slip value S1 as described above.

A particular advantage of this arrangement is that, when the speed of the wheel 290 is above that indicated by the speed control signal 253 control of the electric machine 230 in the speed control mode inevitably causes a negative torque to be applied to the wheel 290 by the electric machine 230. This causes the speed of the wheel to rapidly reduce to the speed indicated by the speed commend signal, thereby reducing the amount of time during which excessive slip occurs.

An alternative approach to implementing the speed control mode would be for the inverter 220 to execute a local speed control algorithm using the motor position information provided by the commutation signal 231 to estimate the speed of the electric machine 230. An internal closed loop control algorithm such as a proportional-integral-differential (PID) algorithm may be used to control the motor torque and implement a local speed controller. However, this approach may produce a slower response to an occurrence of wheel slip than direct control of the commutation speed as described above.

More sophisticated control methodologies may be employed in some embodiments. For example, in some embodiments, the speed control loop implemented by the inverter 220 may be further improved by controlling or influencing directly the rotor position using the stiffness afforded by the magnetic alignment.

In this configuration, preferably implemented by means of a full state feedback structure, the electric currents in the windings are controlled directly to align the magnetic flux in a way that both inherently performs the commutation function and controls the entire rotational states of the compliantly coupled drivetrain, wheel, tyre and non-linear slip characteristic to the road.

In this form, the following primary sources of information are combined together to form a full state estimate of the vehicle's motion over the road surface, and internal states of the wind up of compliant elements (such as engine mountings or suspension movement):

Motor rotor position

Wheel speed or position sensors

Vehicle inertial measurements, potentially auto calibrated from GPS signals

Other vehicle movement detectors, such as radar, vision and map matching techniques Based on this state estimation, the motor commutation, that is the current applied by the power electronics to the motor's windings, is determined for the best composure and driver (or autonomous system) control.

Extensions can be applied to cover uneven (off road) surfaces, deformable surfaces and varying surface characteristics, including predictions (forward looking measurements) or anticipation (from a-priori knowledge from either on or off board maps).

TR Modes

In some embodiments, the vehicle 200 may have a driving mode controller configured to implement a Terrain Response (TR)® System in which the driving mode controller controls settings of one or more vehicle systems or sub-systems such as settings associated with powertrain controller 210C, a transmission system (where present), a steering system such as an electric power assisted steering system (EPAS) (where present), settings of the brakes system via brake controller 212C and a suspension system (where present) in dependence on a selected driving mode. The driving mode may be selected by a driver by means of a driving mode selector dial. Alternatively the driving mode may be selected automatically by the driving mode controller. The driving modes may also be referred to as terrain modes, terrain response modes, or control modes.

In an embodiment, four driving modes are provided: an 'on-highway' driving mode or 'special programs off' (SPO) mode suitable for driving on a relatively hard, smooth driving surface where a relatively high surface coefficient of friction exists between the driving surface and wheels of the vehicle; a 'sand' driving mode (SAND) suitable for driving over sandy terrain; a 'grass, gravel or snow' (GGS) driving mode suitable for driving over grass, gravel or snow, a 'rock crawl' (RC) driving mode suitable for driving slowly over a rocky surface; and a 'mud and ruts' (MR) driving mode suitable for driving in muddy, rutted terrain. Other driving modes may be provided in addition or instead.

It is to be understood that the powertrain controller 210C may be configured to determine the value of surface mu of the driving surface at least in part in dependence on the selected driving mode in which the driving mode controller is causing the vehicle to operate. Thus, in some embodiments the predetermined slip value may be determined according to the selected driving mode.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle control system for controlling at least one electric propulsion motor to drive a wheel of the vehicle, the control system configured to operate in one of a first mode and a second mode in dependence at least in part on an amount of slip experienced by at least one driven wheel, wherein, in the first mode, the control system is configured to cause the at least one electric propulsion motor to generate a predetermined amount of drive torque, wherein, in the second mode, the control system is configured to cause the at least one electric propulsion motor to rotate at a predetermined speed by controlling commutation of the motor so as to enforce a desired speed on rotation of a magnetic field of the motor, and wherein the control system is configured to operate in the first mode if the amount of slip experienced by the at least one driven wheel is below a predetermined slip amount and to operate in the second mode if the amount of slip experienced by the at least one driven wheel exceeds the predetermined slip amount.

2. The control system according to claim 1, wherein the at least one electric propulsion motor is a synchronous motor.

3. The control system according to claim 2, wherein the at least one electric propulsion motor is a switched reluctance motor or a permanent magnet DC electric motor.

4. The control system according to claim 1, wherein control of the at least one electric propulsion motor in the first mode is performed in dependence on an estimate of an angular position of a rotor of the at least one electric propulsion motor.

5. The control system according to claim 1, wherein the control system is further configured to calculate the amount of slip experienced by the at least one driven wheel in dependence on a reference speed signal indicative of a speed of travel of the vehicle over ground and at least one driven wheel speed signal.

6. The control system according to claim 1, wherein the control system is further configured to receive information indicative of a surface coefficient of friction between the at least one driven wheel and a driving surface, and wherein the control system is further configured to set the predetermined slip amount in dependence on the information indicative of the surface coefficient of friction.

7. The control system according to claim 6, wherein the control system is further configured to receive information indicative of a driving mode in which the vehicle is being operated.

8. The control system according to claim 7, wherein the control system is further configured to receive information indicative of a state of a user-operable driving mode control input for selecting a driving mode of the vehicle.

9. The control system according to claim 7, wherein the driving mode is one of a plurality of control modes of at least one subsystem of the vehicle.

10. The control system according to claim 9, wherein the control system is further configured to initiate control of the at least one subsystem of the vehicle in a selected one of the plurality of subsystem control modes, each of the subsystem control modes corresponding to one or more different driving surfaces.

11. The control system according to claim 1, wherein the predetermined slip amount is calculated in dependence on whether the control system is causing a positive torque to be applied to the at least one driven wheel or a negative torque to be applied to the at least one driven wheel.

12. The control system according to claim 1, wherein the predetermined slip amount is set to a first value if the control system is causing a positive torque to be applied to the at least one driven wheel and a second value if the control system is causing a negative torque to be applied to the at least one driven wheel.

13. The control system according to claim 1, wherein the control system is further configured to control a plurality of electric propulsion motors each configured to drive a respective wheel of the vehicle.

14. The control system according to claim 1, wherein the control system is further configured to determine that the amount of slip experienced by the at least one driven wheel exceeds the predetermined slip amount if a speed of the at least one driven wheel exceeds a speed indicated by a speed control signal.

15. A vehicle, comprising:
a plurality of wheels;
a powertrain to drive the plurality of wheels;
a braking system to brake the plurality of wheels; and
a control system, configured to operate in one of a first mode and a second mode in dependence at least in part on an amount of slip experienced by at least one of the wheels,
wherein, in the first mode, the control system is configured to cause the powertrain to generate a predetermined amount of drive torque,
wherein, in the second mode, the control system is configured to cause the powertrain to rotate at a predetermined speed by controlling commutation of a motor of the powertrain so as to enforce a desired speed on rotation of a magnetic field of the motor, and
wherein the control system is configured to operate in the first mode if the amount of slip experienced by at least one of the wheels is below a predetermined slip amount and to operate in the second mode if the amount of slip experienced by at least one of the wheels exceeds the predetermined slip amount.

16. A method of controlling an electric propulsion motor to drive at least one wheel of a vehicle, the method comprising:
causing a control system to operate in one of a first mode and a second mode in dependence at least in part on an amount of slip experienced by the at least one wheel,
whereby in the first mode the method comprises causing the electric propulsion motor to generate a predetermined amount of drive torque, and
in the second mode the method comprises causing the electric propulsion motor to rotate at a predetermined speed by controlling commutation of the electric propulsion motor so as to enforce a desired speed on a rotation of a magnetic field of the electric propulsion motor,
whereby the control system is configured to operate in the first mode if an amount of wheel slip is below a predetermined slip amount and to operate in the second mode if an amount of wheel slip exceeds the predetermined slip amount.

17. A non-transitory computer readable carrier medium carrying computer readable code that, when executed by one or more processors, causes the one or more processors to control a vehicle to carry out the method of claim 16.

* * * * *